United States Patent
Okada et al.

(10) Patent No.: US 7,311,451 B2
(45) Date of Patent: Dec. 25, 2007

(54) METHOD OF MANUFACTURING OPTICAL COMMUNICATION MODULE, AND OPTIMUM MOLD AND LEAD FRAME FOR USE IN THE MANUFACTURING METHOD

(75) Inventors: Takeshi Okada, Osaka (JP); Hiromi Nakanishi, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 270 days.

(21) Appl. No.: 10/349,692

(22) Filed: Jan. 23, 2003

(65) Prior Publication Data

US 2004/0145883 A1     Jul. 29, 2004

(51) Int. Cl.
G02B 6/42     (2006.01)
H01L 21/02    (2006.01)

(52) U.S. Cl. .................. 385/91; 385/94; 438/117
(58) Field of Classification Search ............... 385/91, 385/94; 438/117
See application file for complete search history.

(56) References Cited

U.S. PATENT DOCUMENTS 6,833,999 B2 * 12/2004 Go .................... 361/813

FOREIGN PATENT DOCUMENTS

| JP | 04-239614 | 8/1992 |
| JP | 04-307214 | 10/1992 |
| JP | 10-258430 | 9/1998 |
| JP | 11237532 A | 8/1999 |

* cited by examiner

*Primary Examiner*—Sung Pak
*Assistant Examiner*—Jerry T. Rahll
(74) *Attorney, Agent, or Firm*—Fish & Richardson P.C.

(57) ABSTRACT

A method of manufacturing an optical communication module, and a mold and a lead frame that are suitable for the method are provided. The method comprises the steps of: placing in a mold the lead frame on which a ferrule and an optical communication facility section are mounted; pressing the ferrule by a moving part that can be stopped at a given position relative to the mold (lower mold tool) such that the distal end of the ferrule is positioned at a proper location within the mold; and filling a resin into the mold, wherein a displacement and a reactive force generated in the lead frame when it is pressed are absorbed by springs provided in the lead frame when it is pressed are absorbed by springs provided in the lead frame such that a catching portion for coupling to a connector is formed with high accuracy at a proper position relative the distal end of the ferrule.

2 Claims, 6 Drawing Sheets

PRIOR ART

METHOD OF MANUFACTURING OPTICAL COMMUNICATION MODULE, AND OPTIMUM MOLD AND LEAD FRAME FOR USE IN THE MANUFACTURING METHOD

BACKGROUND OF THE INVENTION

1. Field of the Invention

The present invention relates to a method of manufacturing an optical communication module, and a mold and a lead frame suitable for use in the manufacturing method. More particularly, the method enables manufacture of the optical communication module such that a catching part thereof for coupling to a connector is formed at a proper position relative to a distal end of a ferrule.

2. Description of the Related Art

Figure 6:
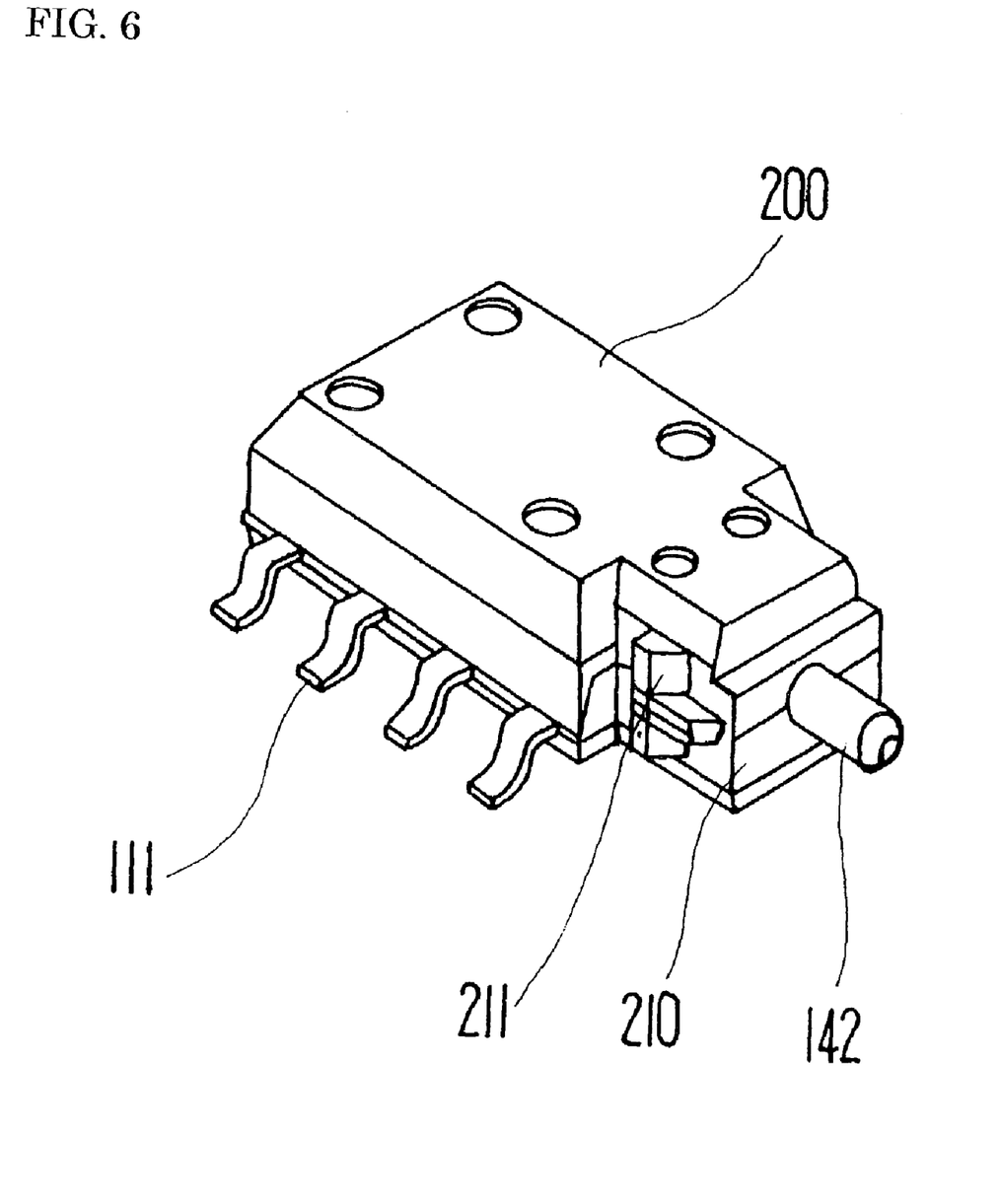
FIG. 6 is a perspective view of an optical communication module obtained by the method of the present invention.

FIG. 6 shows a known surface-mounting optical communication module with a built-in optical communication facility section. The known optical communication module has a structure in which the optical communication facility section is contained in a resin mold 200 having a thin rectangular parallelepiped form, an optical fiber ferrule 142 is projected from one end of the resin mold 200, and a plurality of leads 111 are projected from both lateral surfaces thereof. On the proximal side of the ferrule 142, a catching part 210 is formed for coupling to a connector (not shown) such that the connector is not easily slipped off. The catching part 210 has catching projections 211 formed on its both lateral sides, and the connector has claws engaging with the catching projections 211. When the connector is fitted to the catching part 210, the claws of the connector are brought into engagement with the catching projections 211, whereby slipping-off of the connector is prevented. In order to ensure the positive connection between the optical communication module and the connector, therefore, it is very important to precisely form the catching projections 211, serving as a physical reference position, in a proper position relative to a distal end of the ferrule 142, which serves as an optical reference position.

Such a known optical communication module is manufactured by placing the ferrule 142 and a lead frame 110, on which the optical communication facility section is mounted, in a mold and then filling a resin into the mold so that the optical communication facility section is enclosed and the catching part 210 for coupling to the connector is formed by resin molding.

Figure 7:
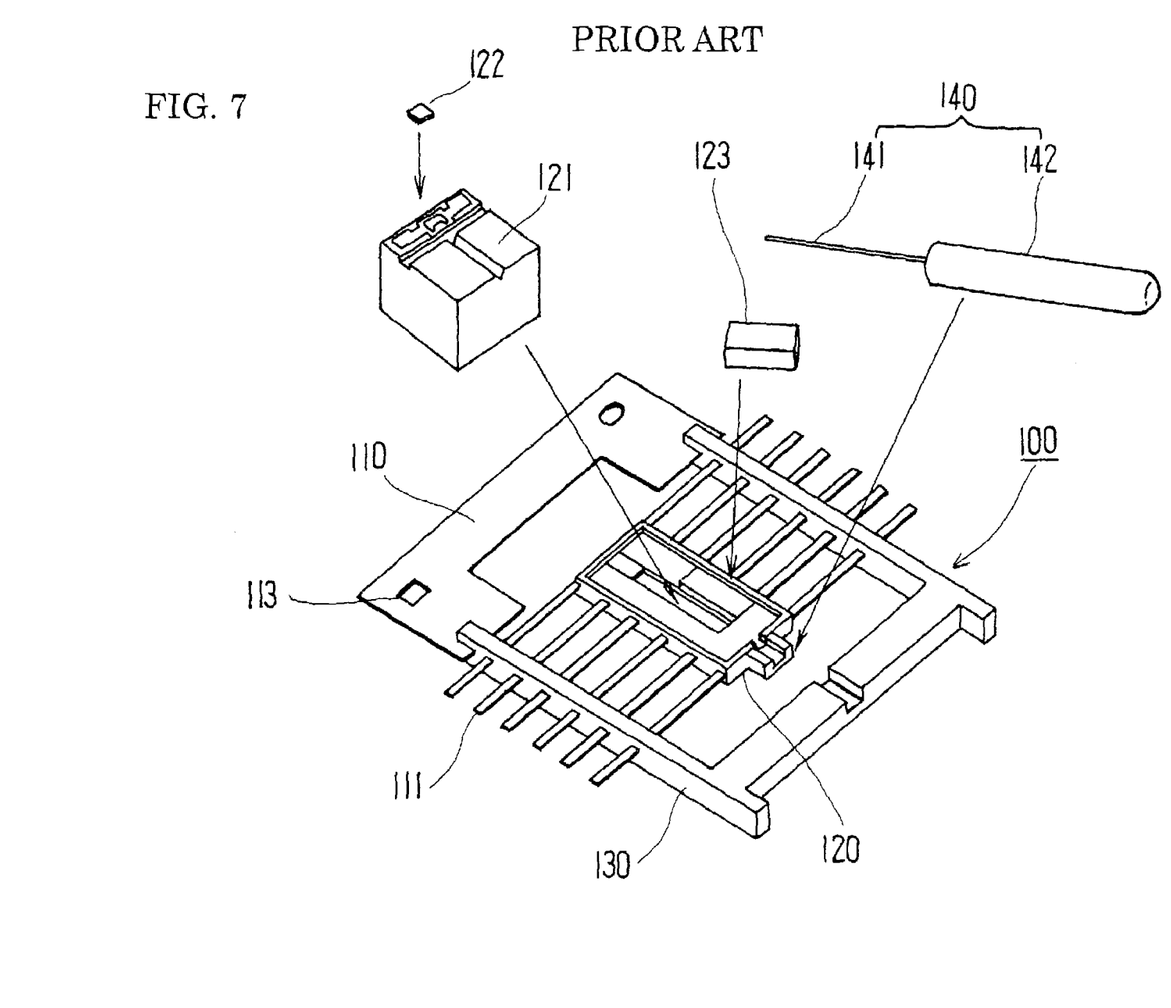
FIG. 7 is a schematic view of a conventional lead frame.

The method of manufacturing the optical communication module will now be briefly described with reference to FIGS. 7 and 8. First, a light emitting device and/or light receiving device 122 comprising at least one of a light emitting device, such as a photodiode (PD), and a light receiving device, such as a laser diode (LD), is mounted on an Si bench 121 (FIG. 7). On the other hand, a sub-package 100 is prepared on which the Si bench 121 is to be mounted. The sub-package 100 includes the lead frame 110 comprising a mounting part 120 made of an insulating material and a frame portion 130 supporting and insulating the leads 111 from each other. The Si bench 121 and electronic parts 123 are mounted on the mounting part 120. The light emitting device and/or light receiving device 122 and the electronic parts 123 are connected to the leads 111 by wire bonding. An optical fiber capillary 140 is mounted so as to extend from the mounting part 120 to the frame portion 130. The electronic parts 123 used herein include, for example, an LD driver IC, a monitoring photodiode (M-PD) for detecting the intensity of a laser beam emitted from the LD, and an amplifier for amplifying a signal from the PD. The optical fiber capillary 140 is formed by fitting the ferrule 142 to a short-length optical fiber 141. After mounting the Si bench 121, the electronic parts 123, etc. on the sub-package 100, the sub-package 100 is placed on a mold tool and positioned at a proper location within the mold.

The procedures for positioning the sub-package into the mold will be described with reference to FIG. 8. The mold comprises an upper mold tool (not shown) and a lower mold tool 320. A pin and a block positioning projection 360 are formed on an inner surface of the lower mold tool 320. On the other hand, a fitting hole 113 for receiving the positioning projection 360 is formed in a part of the lead frame 110. The sub-package 100 on which the light emitting device and/or light receiving device 122, the electronic parts 123, and the like are mounted is set in the mold such that the positioning projection 360 is fitted to the fitting hole 113. As a result, the position of the lead frame 110 within the mold is determined and hence the position of the distal end of the ferrule 142 mounted on the lead frame 110 is also determined. Then, by closing the mold (i.e., fitting the upper mold tool (not sown) to the lower mold tool 320) and filling a resin therein, a resin molded optical communication module is formed such that the catching part is formed at a desired position relative to the distal end of the ferrule with some degree of accuracy.

However, the above-described related art has a difficulty in forming the catching part with high accuracy at an exactly desired position relative to the distal end of the ferrule by resin molding.

In the conventional resin molding, the catching part for coupling to the connector is positioned relative to the distal end of the ferrule by aligning the positioning projection of the mold with the fitting hole of the lead frame. However, due to part tolerances and variations in accuracy in mounting the ferrule to the sub-package 100, the catching part for coupling to the connector cannot always be precisely positioned relative to the distal end of the ferrule. As a matter of course, various designs, such as forming a positioning groove and providing a positioning attachment, have been proposed for the purpose of precisely mounting the ferrule relative to the lead frame. Those endeavors have failed to eliminate variations in the mounting accuracy to a satisfactory extent.

SUMMARY OF THE INVENTION

Accordingly, it is a main object of the present invention to provide a method of manufacturing an optical communication module, which can form a catching part for coupling to a connector by resin molding with high accuracy relative to a distal end of a ferrule.

Another object of the present invention is to provide a mold for manufacturing the optical communication module, and a lead frame, which are optimum for use in the above manufacturing method.

According to the present invention, those objects are achieved by aligning the distal end of the ferrule using a moving part that can be precisely positioned relative to the mold.

More specifically, according to the present invention, a method of manufacturing an optical communication module comprises the steps of: placing a lead frame, on which a ferrule and an optical communication facility section are mounted, into a mold; pressing the ferrule by a moving part that is designed to stop at a given position relative to the mold, and positioning a distal end of the ferrule at a proper location within the mold; and filling a resin into the mold to form the optical communication module such that a catching portion for coupling to a connector is formed at a proper position relative to the distal end of the ferrule.

In the related art, even when the lead frame and the fitting hole are formed with high accuracy to the extent possible, it is difficult to resin-mold the catching part for coupling to the connector with high accuracy relative to the distal end of the ferrule unless the ferrule can be mounted to the lead frame with high accuracy.

With the present invention, the ferrule is pressed by the moving part that is stopped at the a certain position relative to the mold, and the distal end of the ferrule can always be positioned at the proper location by moving the moving part to the certain position. As a result, in spite of accuracy variations caused in mounting the ferrule to the lead frame, the catching portion for coupling to the connector can be resin-molded with high accuracy relative to the distal end of the ferrule.

According to the present invention, a mold for manufacturing an optical communication module comprises: a mold tool, in which a lead frame provided with a ferrule and an optical communication facility section is to be placed; a moving part that can be stopped at a given position relative to the mold tool and can press the ferrule so as to position a distal end of the ferrule at a proper location within a mold; an elastic member for absorbing a displacement and reactive force of the lead frame when the ferrule is pressed by the moving part; and a stopper abutting on the elastic member.

Preferably, the mold may comprise an upper mold tool and a lower mold tool that are capable of being opened and closed, the moving part has a first inclined surface, the upper mold tool has a second inclined surface fitting the first inclined surface, and the second inclined surface presses the first inclined surface in conjunction with closing operation of the upper mold tool, thereby causing the moving part to advance toward the ferrule side.

Pressing the ferrule by means of the moving part that can be stopped at a given position relative to the mold tool enables the distal end of the ferrule to be positioned precisely at the proper location within the mold tool.

Usually, the mold comprises an upper mold tool and a lower mold tool, and a lead frame to which the ferrule and the optical communication facility section are mounted is set in the lower mold tool. Therefore, a positioning groove may be formed in the lower mold tool, and the moving part capable of being fitted to the positioning groove should be employed. The positioning groove is preferably formed in a V-form so as to enable the moving part fitted to the positioning groove to stop precisely at a desired position. The positioning groove is preferably formed in a V-form to positively stop the moving part fitted to the positioning groove at the certain position.

When the distal end of the ferrule is pressed by the moving part, it is moved together with the lead frame, and the elastic member is able to absorb a displacement and a reactive force thereof. A spring can be usually employed as the elastic member. The elastic member may be provided on the mold tool, or a spring may be formed in a part of the lead frame. One practical example of the stopper abutting on the elastic member is a projection provided on the mold tool. The displacement and reactive force of the lead frame pressed by the moving part are absorbed by a compression spring disposed between the stopper and the lead frame, or by a spring formed in a part of the lead frame so as to abut the stopper.

Further, a lead frame according to the present invention is provided with a ferrule and an optical communication facility section, wherein an elastic member is provided on the side opposed to a distal end of the ferrule such that the displacement and reactive force of the lead frame are absorbed when the lead frame is moved to a proper location within a mold.

Forming the elastic member in the lead frame itself enables the displacement and reactive force of the lead frame to be absorbed easily when the lead frame is set in the mold and positioned by the moving part. Also, since there is no necessity of employing the elastic member as an independent part, the number of parts can be reduced.

As described above, in the method of manufacturing an optical communication module according to the present invention, the distal end of a ferrule can be positioned precisely at a proper location by simply pressing the ferrule to the extent where the moving part, which is designed to stop at a given position relative to a mold tool, stops at the given position.

Further, the mold and the lead frame according to the present invention have a structure that is optimum for realizing the manufacturing method set forth above.

DESCRIPTION OF THE PREFERRED EMBODIMENTS

An embodiment of the present invention will be described below. To avoid redundant descriptions, the same components are denoted by the same characters common to all of the drawings.

Embodiment

Figure 1:
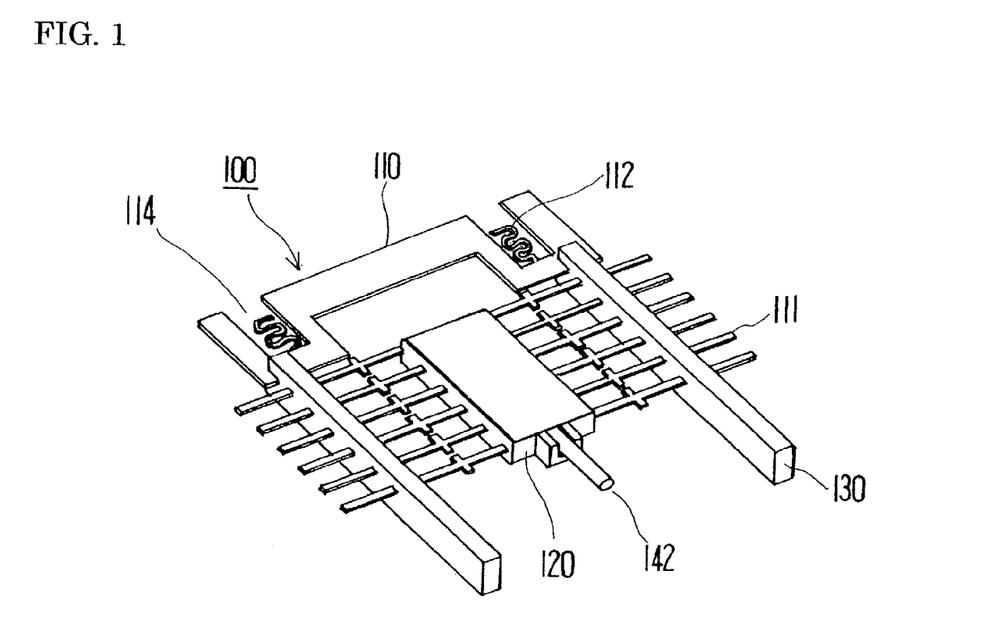
FIG. 1 is a schematic perspective view of a lead frame according to the present invention.
Figure 2:
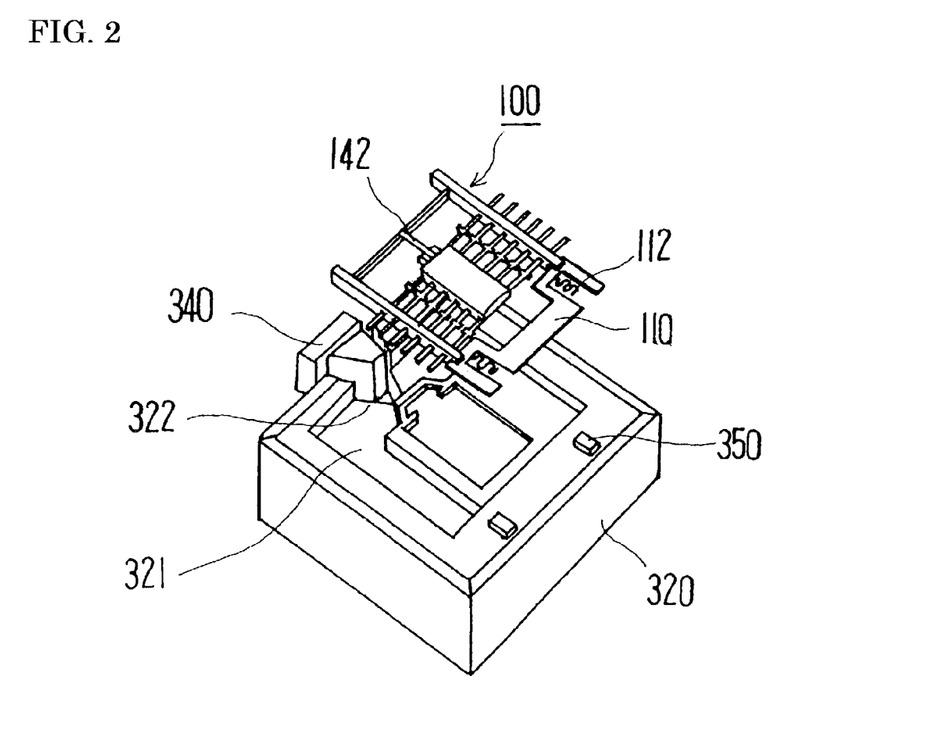
FIG. 2 is a view for illustrating a step of setting the lead frame shown in FIG. 1 onto a mold tool.
Figure 3:
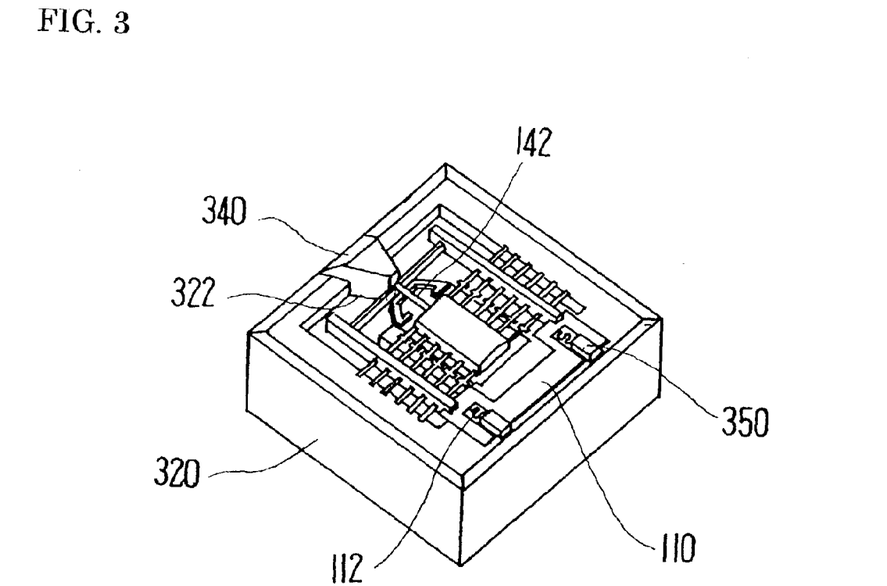
FIG. 3 is a view for illustrating a step of positioning a ferrule integral with a lead frame by means of a moving part in a state where the lead frame is set in the mold tool.
Figure 4:
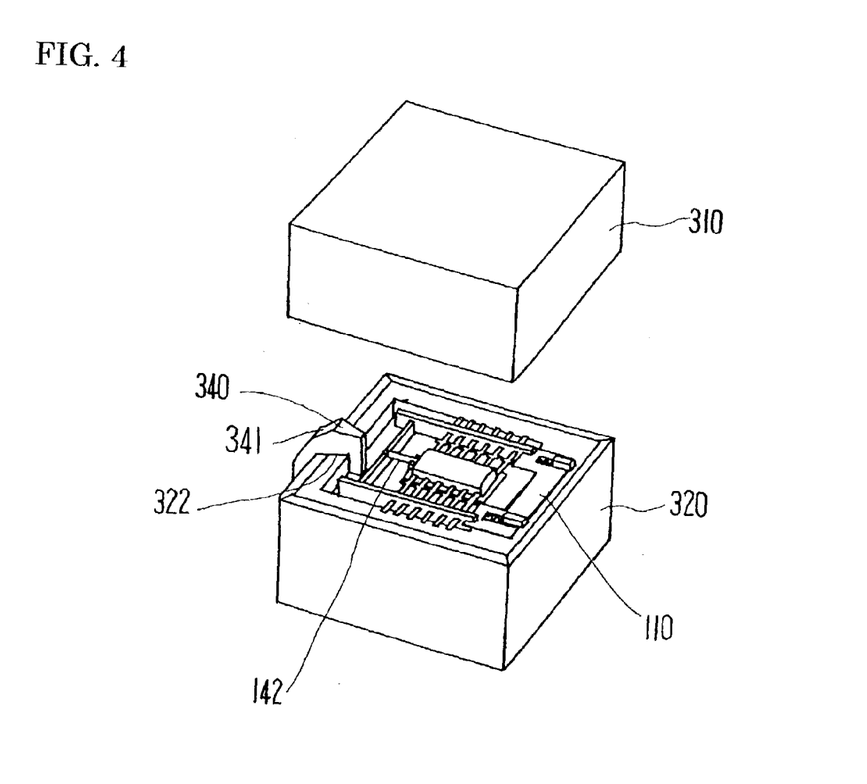
FIG. 4 is an explanatory view showing a condition just before closing an upper mold tool.
Figure 5:
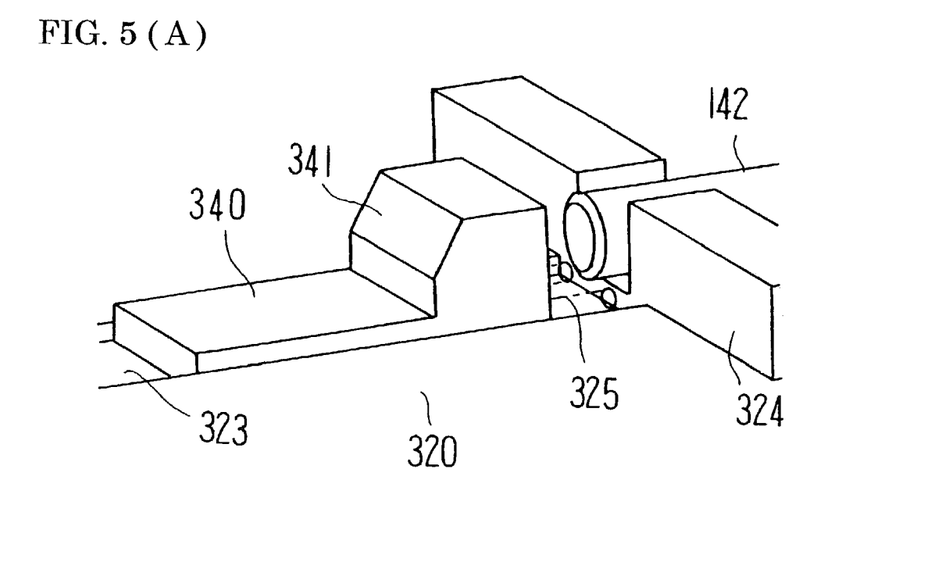
FIG. 5(A) is a perspective view showing a part of a lower mold tool and a moving part, which is different from that shown in FIG. 3.
FIG. 5(B) is a front view showing those components.

FIG. 1 is a schematic perspective view of a lead frame according to the present invention. FIG. 2 is an explanatory view showing a step of setting the lead frame, shown in FIG. 1, in a mold tool. FIG. 3 is an explanatory view showing a step of positioning a ferrule, which is integral with the lead frame set in the mold tool, using a moving part. FIG. 4 is an explanatory view showing a condition just before closing an upper mold tool. FIG. 5(A) is a perspective view showing a moving part, which is different from that shown in FIG. 3, and a lower mold tool, and FIG. 5(B) is a front view showing those components. FIG. 6 is a perspective view of a optical communication module obtained by the method of the present invention.

<Outline of Manufacturing Method>

According to the present invention, a method of manufacturing an optical communication module comprises the steps of mounting a ferrule 142 and an optical communication facility section on a lead frame 110, setting the lead frame 110 in upper and lower mold tools 310 and 320, positioning the lead frame 110 at a proper location, and filling a resin into a mold to form a resin molded module (FIGS. 2 to 4). For positioning the lead frame 110, the ferrule 142 is pressed by a moving part 340 such that the position of the distal end of the ferrule 142 is determined. Then, filling a resin into the mold tool allows a catching part of the module for coupling to a connector to be molded with high accuracy relative to the distal end of the ferrule.

<Mounting of Devices, etc. to Lead Frame>

The lead frame 110 used in this embodiment has the same structure (FIG. 1) as the lead frame described above with reference to FIG. 7 except for that springs 112, described later, are provided. More specifically, a sub-package 100 includes the lead frame 110 comprising a mounting part 120 made of an insulating material and a frame portion 130 supporting and insulating the leads 111 from each other. At least one of a light emitting device and a light receiving device is mounted on an Si bench. The Si bench and electronic parts are mounted on the mounting part 120. The light emitting device and/or light receiving device and the electronic parts are connected to the leads 111 by wire bonding. The electronic parts include, for example, an LD driver IC, an M-PD for detecting the intensity of a laser beam emitted from the LD, and an amplifier for amplifying a signal from the PD. Those mounted parts are omitted in FIG. 1. An optical fiber capillary is mounted so as to extend from the mounting part 120 to the frame portion 130. The optical fiber capillary is formed by fitting the ferrule 142 to a short-length optical fiber 141. The light emitting device and/or light receiving device and the electronic parts constitute the optical communication facility section.

The springs 112 are each provided in a part of the lead frame 110 on the side opposed to the ferrule 142. In this embodiment, the springs 112 are provided by etching both side portions of the lead frame 110 so as to form thin waveform pieces. As an alternative method, the springs 112 can also be formed by pressing (punching). In other words, the spring 112 and a fitting notch 114 are formed in place of the fitting hole 113 in the lead frame of FIG. 7. When the lead frame 110 is pressed by the moving part 340 (described later), the springs 112 have a function of absorbing a displacement of the lead frame 110 and a reactive force generated upon the pressing of the lead frame 110. Further, a projection serving as a stopper is fitted to the fitting notch 114.

<Construction of Mold>

The lower mold tool 320, in which the lead frame 110 is set, is provided with the moving part 340. As shown in FIGS. 2 to 4, a mold comprises the upper mold tool 310 and the lower mold tool 320. A cavity 321 is formed in each of the upper and lower mold tools in shape matching the intended resin mold of the optical communication module such that the optical communication module is formed by filling a resin into the cavity 321 after closing the upper and lower mold tools.

A V-shaped positioning groove 322 is formed in the lower mold tool 320. The moving part 340 is formed as a block-like member having a V-shape tapered such that it is snugly fitted to the positioning groove 322. When the moving part 340 is fitted to the positioning groove 322 to its full stroke, the distal end of the moving part 340 defines a proper position for the distal end of the ferrule 142. In other words, the mold tool is designed such that the mold cavity 321 includes a portion which can form the catching part of the module for coupling to the connector, and such portion and the distal end of the moving part 340 fitted in the positioning groove 322 can have a proper positional relationship with each other.

<Movement of Moving Part>

The moving part 340 is projected upward beyond the cavity 321 of the lower mold tool 320, and the distal end of the moving part 340 presses the ferrule 142 set in the lower mold tool 320 when the moving part 340 is fitted to the positioning groove 322. The moving part 340 is moved in conjunction with closing of the upper mold tool 310. More specifically, a first inclined surface 341 is formed on the moving part 340 on the side opposed to the ferrule 142, and a second inclined surface that fits the first inclined surface 341 is formed in the upper mold tool 310. When the upper mold tool 310 is closed, the second inclined surface of the upper mold tool 310 presses the first inclined surface 341 of the lower mold tool 320, thereby causing the moving part 340 to advance toward the ferrule side. As an alternative, the moving part 340 may be moved using an actuator, such as a motor, or may be simply moved by manual operation.

FIGS. 5(A) and 5(B) show a moving part having a modified structure. This moving part 340 has a form of a substantially L-shape instead of the above-described V-shape. A guide positioning groove 323, along which the moving part 340 slides, is formed in a part of the lower mold tool 320, and a stopper 324 for stopping the moving part 340 at a proper position is provided at an end of the guide positioning groove 323. The moving part 340 also has a first inclined surface 341 that fits a second inclined surface 311 of the upper mold tool 310. Therefore, the moving part 340 is advanced toward the ferrule side in conjunction with the closing operation of the upper mold tool 310. A compression spring 325 is interposed between the moving part 340 and the stopper 324. When the upper mold tool 310 is opened from the closed position, the moving part 340 is caused to move back by a repulsive force of the compression spring 325.

When the moving part 340 presses the ferrule 142, the lead frame 110 integral with the ferrule 142 is displaced in the direction of movement of the moving part 340. This displacement of the moving part 340 and a reactive force are absorbed by the springs 112 disposed in the lead frame 110. A pair of block-shaped projections 350 serving as stopper for the springs 112 are formed on an upper surface of the lower mold tool 320. The projections 350 are fitted into the fitting notch 114 and are contacted with the springs 112 so that the lead frame 110 is prevented from getting out of place within the mold tool beyond a predetermined limit.

<Filling of Resin>

When the moving part 340 is fitted to the groove 322 to its full stroke, the distal end of the ferrule 142 is located at the proper position within the mold tool. Then, the upper mold tool 310 is closed, and a resin is filled into the mold cavity (FIG. 4). The resin used here is, e.g., an epoxy resin. After filling the resin, the upper mold tool 310 and the lower mold tool 320 are opened and the optical communication module formed by a resin mold is taken out.

<Optical Communication Module>

The thus-obtained optical communication module has a structure in which, as shown in FIG. 6, the optical communication facility section is contained in a resin mold 200 having a thin rectangular parallelepiped form, the optical fiber ferrule 142 is projected from one end of the resin mold 200, and the plurality of leads 111 are projected from both lateral surfaces thereof. On the proximal side of the ferrule 142, a catching part 210 is formed for coupling to the connector such that the connector is not easily slipped off. The catching part 210 has catching projections 211 formed on its both lateral sides. When the connector is fitted to the catching part 210, claws of the connector are coupled with the catching projections 211, whereby slipping-off of the connector is prevented. In this embodiment, provided on both lateral sides of the catching part 210 are the catching projections 211 having a substantially triangular shape (as seen from a position above the module) such that the apex thereof is on the side of the distal end of the ferrule and the opposite side thereof is the bottom. By positioning the distal end of the ferrule with the aid of the moving part 340, the position of the pair of catching projections 211 and the position of the distal end of the ferrule are determined with high accuracy.

(Test Example)

Figure 8:
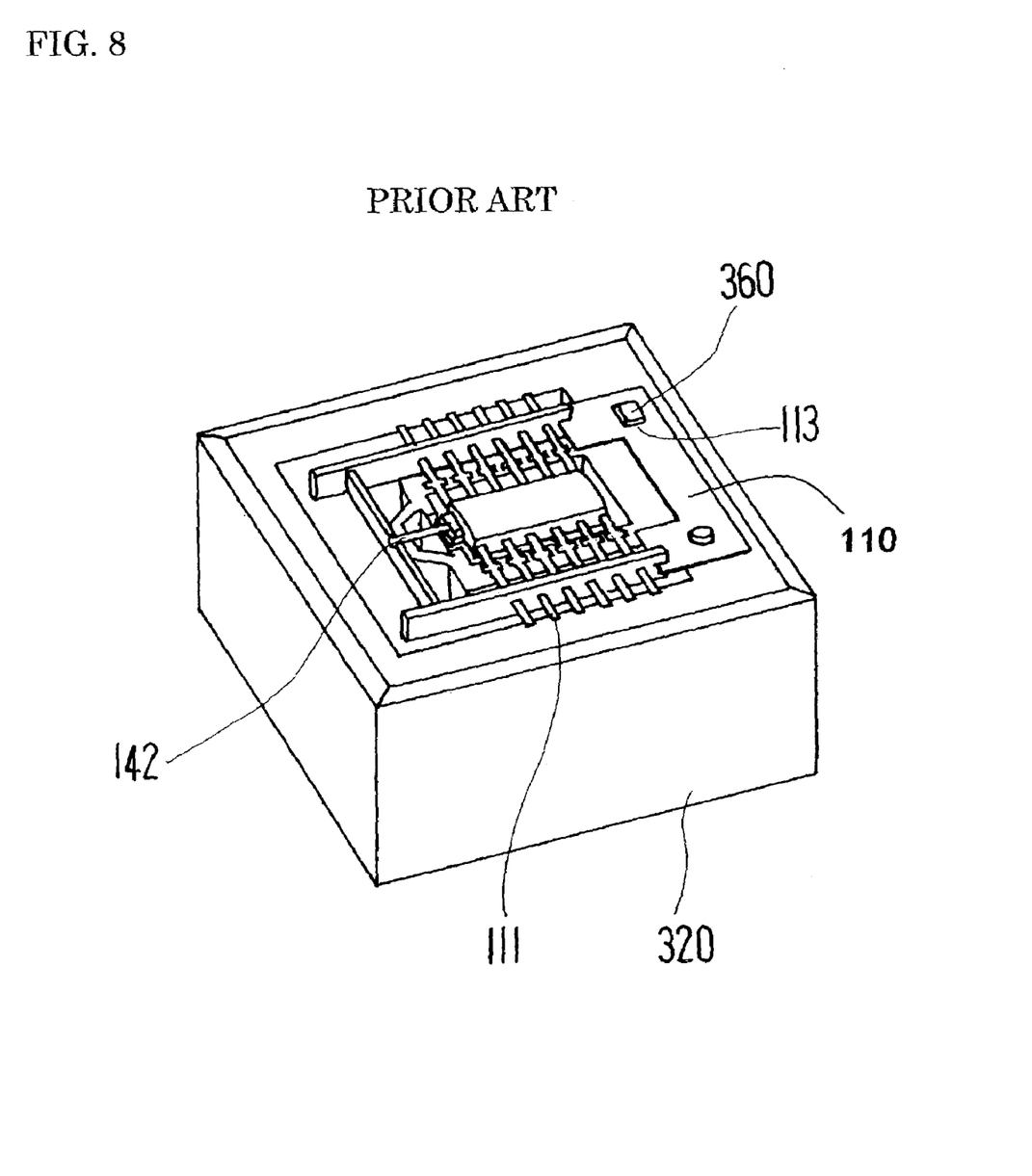
FIG. 8 is an explanatory view showing a step of setting the conventional lead frame in a mold tool.

The optical communication modules obtained with the manufacturing method of the present invention and the optical communication modules obtained with the conventional method shown in FIGS. 7 and 8 were measured in terms of the distance between the distal end of the ferrule and the pair of catching projections and variations in the measured distances among products were reviewed. The following Table shows measured values, average values, and standard deviations.

TABLE

| Distance between distal end of ferrule and molded catching projection (mm). | | |
|---|---|---|
| | Conventional method | Method of Present invention |
| 1 | 2.448 | 2.435 |
| 2 | 2.455 | 2.433 |
| 3 | 2.462 | 2.418 |
| 4 | 2.448 | 2.416 |
| 5 | 2.451 | 2.441 |
| 6 | 2.444 | 2.447 |
| 7 | 2.450 | 2.440 |
| 8 | 2.494 | 2.438 |
| 9 | 2.510 | 2.438 |
| 10 | 2.479 | 2.436 |
| Average | 2.464 | 2.434 |
| Standard deviation | 0.0226 | 0.0098 |

As will be apparent from the above Table, the standard deviation as an index of variations was much improved from about 23 μm to 10 μm.

What is claimed is:

1. A method of manufacturing an optical communication module comprising a mold tool, in which a lead frame including a ferrule and an optical communication facility section both mounted thereon is placed, and a moving part that can be stopped at a given position relative to said mold tool and can press said ferrule so as to position a distal end of said ferrule at a proper location within said mold tool, said mold tool comprising an upper mold tool and a lower mold tool capable of being opened and closed, said moving part having a first inclined surface, said upper mold tool having a second inclined surface to fit said first inclined surface, and said second inclined surface being capably of pressing said first inclined surface in conjunction with closing operation of said upper mold tool, thereby causing said moving part to advance toward the ferrule side, the method comprising:

placing a the lead frame in the mold, said lead frame provided with the ferrule and the optical communication facility section both mounted thereon;

pressing said ferrule by the moving part that is moved in conjunction with closing operation of the upper mold tool and positioning the distal end of said ferrule at a proper location within said mold while absorbing a displacement and a reactive force of the lead frame by an elastic member in the lead frame; and filling a resin into said mold such that a catching portion for coupling to a connector is formed at a proper position relative to the distal end of said ferrule.

2. A mold for manufacturing an optical communication module comprising: a mold tool, in which a lead frame including a ferrule and an optical communication facility section both mounted thereon is placed; a moving part that can be stopped at a given position relative to said mold tool and can press said ferrule so as to position a distal end of said ferrule at a proper location within said mold tool; an elastic member for absorbing a displacement and a reactive force of said lead frame when said ferrule is pressed by said moving part; and a stopper abutting on said elastic member, wherein said mold tool comprises an upper mold tool and a lower mold tool capable of being opened and closed, said moving part has a first inclined surface, said upper mold tool has a second inclined surface to fit said first inclined surface, and said second inclined surface can press said first inclined surface in conjunction with closing operation of said upper mold tool, thereby causing said moving part to advance toward the ferrule side.

* * * * *

UNITED STATES PATENT AND TRADEMARK OFFICE
CERTIFICATE OF CORRECTION

| | | |
|---|---|---|
| PATENT NO. | : 7,311,451 B2 | Page 1 of 1 |
| APPLICATION NO. | : 10/349692 | |
| DATED | : December 25, 2007 | |
| INVENTOR(S) | : Takeshi Okada and Hiromi Nakanishi | |

It is certified that error appears in the above-identified patent and that said Letters Patent is hereby corrected as shown below:

Title Page, add the foreign priority data:

--Section (30) Foreign Application Priority Data

February 1, 2002     (JP)         P. 2002-026161--;

Col. 8, claim 1, line 18, "placing a the lead frame" should be --placing the lead frame--

Signed and Sealed this

Ninth Day of December, 2008

JON W. DUDAS
*Director of the United States Patent and Trademark Office*